May 21, 1963 J. V. COPELAND ET AL 3,090,605
FEED MIXER
Filed Aug. 9, 1961 2 Sheets-Sheet 1

INVENTORS
JAMES V. COPELAND &
BY BENJAMIN R. NEIER

*Fishburn & Gold*
ATTORNEYS

May 21, 1963  J. V. COPELAND ET AL  3,090,605
FEED MIXER
Filed Aug. 9, 1961  2 Sheets-Sheet 2
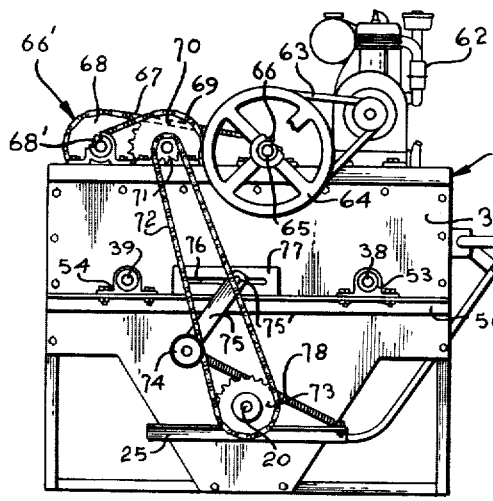
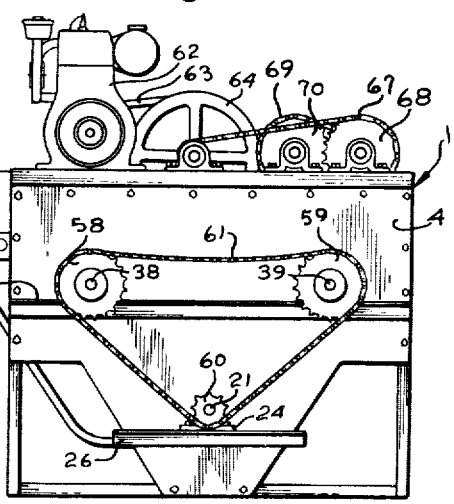
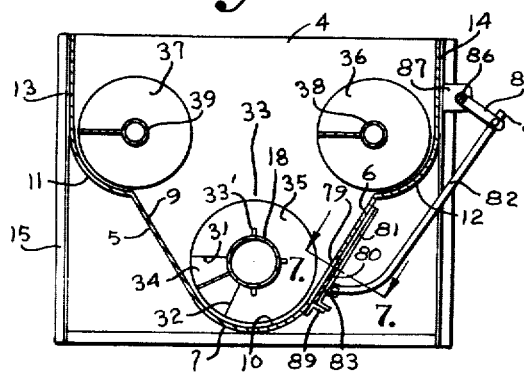
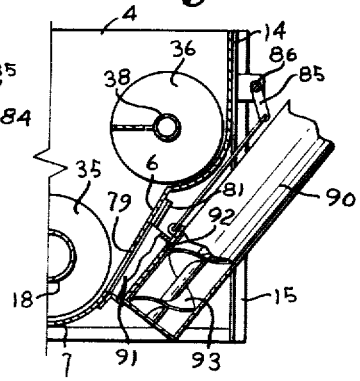
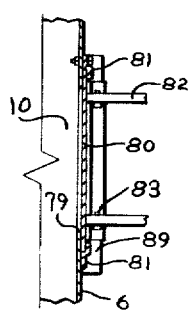
INVENTORS
JAMES V. COPELAND &
BY BENJAMIN R. NEIER
ATTORNEYS

United States Patent Office 3,090,605
Patented May 21, 1963

3,090,605
FEED MIXER
James V. Copeland, Greensburg, and Benjamin R. Weier, Mullinville, Kans.
Filed Aug. 9, 1961, Ser. No. 130,311
7 Claims. (Cl. 259—104)

This invention relates to mixers, and more particularly to portable apparatus for mixing fluent materials such as animal feeds and the like.

Various devices are presently is use on farms and in feed lots for mixing animal feeds, but such devices are often unsatisfactory in their operation. Many fail to produce high uniformity of mixing in a reasonable time, are difficult to load and unload and are considerably limited in the types of feed that can be efficiently mixed. There has been a long felt need for a mixing apparatus which has the ability to receive different types of feed including one or more of materials such as grain, food supplements, silage, molasses and the like, and produce therefrom in a reasonable time a thoroughly homogenous mix that is ready for animal consumption.

It is therefore, the principal objects of the present invention to provide a mixing apparatus which overcomes the above-described difficulties found in prior art devices; and to provide a mixer having a plurality of feed screws adapted to produce thorough intermixing of fluent materials as they are translated or conveyed in various directions within a hopper; to provide agitators on selected feed screw shafts to eliminate the tendency for fluent materials to pack against the hopper wall at the ends of the feed screw flights; to provide a pair of laterally spaced or side feed screws adapted to convey feed in one direction and a lower or bottom feed screw spaced below said side feed screws and adapted to convey feed in the opposite direction; to provide a bottom feed screw having a flight reversed in direction to a main flight thereon for moving fluent materials toward an area of mutual convergence and to force or crowd said materials upwardly into said side feed screws thereabove; to provide a discharge port adjacent the area of mutual convergence whereby the bottom feed screw tends to urge the mixed feed out of said port when opened; to provide a relative arrangement of feed screws and cooperative hopper portions for relative longitudinal movement of material with turbulence in adjacent portions of the path for mixing; to provide such a mixing apparatus including a partially cylindrical concave bottom having a bottom feed screw adjacent thereto and a pair of partially cylindrical concave portions spaced upwardly and laterally of the concave bottom and having side feed screws adjacent thereto to produce an efficient mixing action; to provide such a mixing device which operates with high efficiency both at full capacity and with very small loads; to provide such an apparatus having a pair of side feed screws and a bottom feed screw each having helical flights with the same pitch but with the bottom feed screw rotating at twice the speed of the upper feed screws so as to induce rapid mixing; and to produce such a device which is of simple construction, of low profile and easily transported to and from a desired site of operation.

Other objects and advantages of this invention will become apparent from the following description taken in connection with the accompanying drawings wherein are set forth by way of illustration and example certain embodiments of this invention.

FIG. 4 is an end view of the apparatus showing the forward wall of the hopper.

FIG. 5 is an end view of the apparatus showing the rear wall of the hopper.

FIG. 6 is a sectional view through the apparatus taken on the line 6—6, FIG. 1, particularly showing the relative position of the mixed feed outlet door with respect to the bottom feed screw.

FIG. 7 is a fragmentary sectional view through the hopper side wall taken on the line 7—7, FIG. 6, showing details of the outlet door.

FIG. 9 is a fragmentary sectional view through the hopper side wall showing a modified form of outlet door in combination with an outlet screw elevator.

Figure 1:
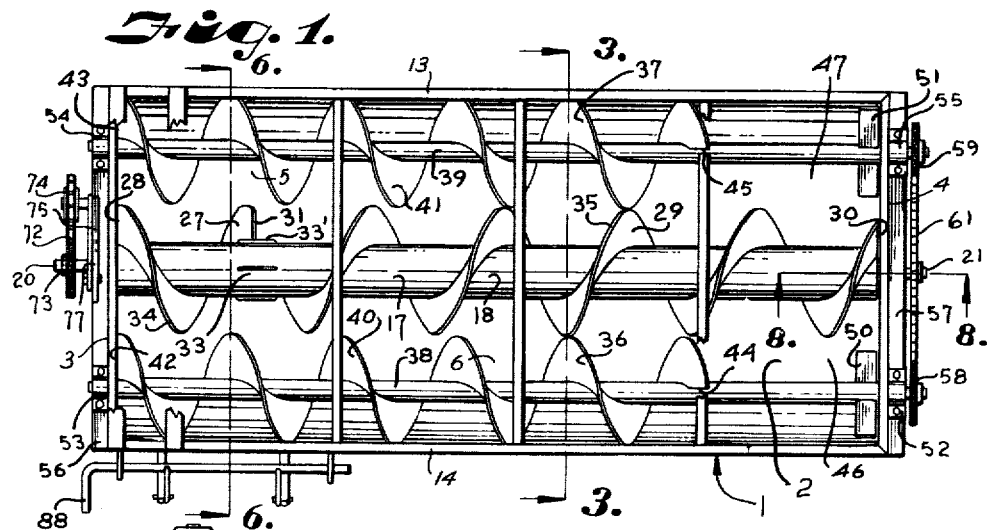
FIG. 1 is a plan view of the apparatus with the prime mover and adjacent parts taken away illustrating the feed screws and relative positions thereof.
Figure 2:
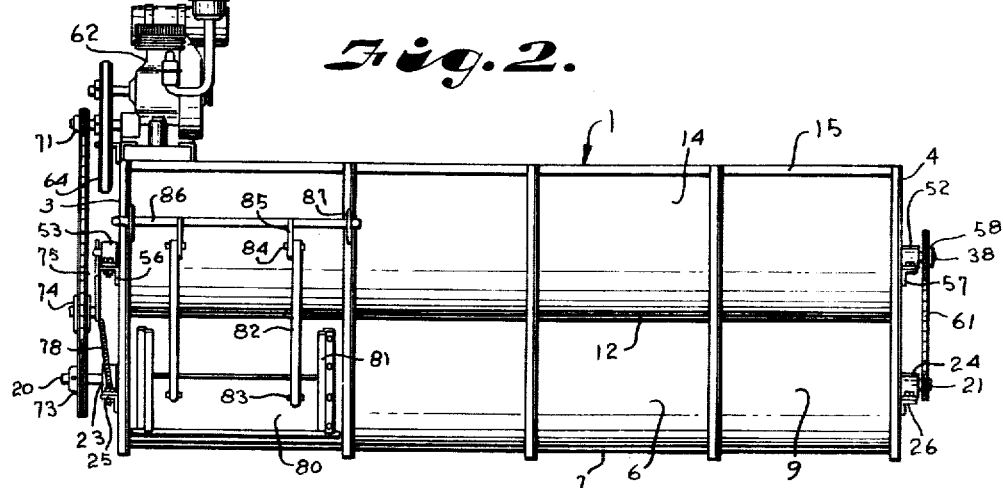
FIG. 2 is a side elevation of the apparatus showing the hopper construction and driving members for rotating the screws.

Referring to the drawings in more detail:

The reference numeral 1 indicates generally the apparatus constituting a preferred embodiment of this invention. The apparatus 1 comprises an open chamber or hopper 2 adapted to receive fluent materials to be mixed, as for example, various feeds and nutrient materials for animals. The hopper 2 includes a vertically extending forward wall 3 and a vertically extending rear wall 4 spaced from and parallel to said forward wall. The hopper 2 also includes a pair of generally upwardly extending side walls 5 and 6 located between said forward wall 3 and rear wall 4 connected at their lower portions in a transversely curved or arcuate portion 7 defining a horizontally extending trough 8. The side walls 5 and 6 are preferably formed of a single piece of sheet material and incline or diverge mutually outwardly as they extend upwardly, forming sides 9 of the horizontally extending trough 8. Due to the arcuate portion 7, the trough 8 exhibits a partially cylindrical elongated concave bottom 10 including approximately 120 degrees. The side walls 5 and 6 are respectively shaped so as to include horizontally extending elongated partially cylindrical concave portions 11 and 12 spaced upwardly and laterally of the trough 8 and each including approximately 90 degrees. The side walls 5 and 6 respectively extend vertically upwardly to form substantially upright portions 13 and 14 respectively above the concave portions 11 and 12. A suitable rigid frame structure 15 preferably comprised of lightweight high strength angles and/or channels 16 is secured to the walls 3, 4, 5 and 6 to maintain said walls in fixed relative relation, producing a rigid apparatus adapted to be lifted and transported to any desired location without danger of warpage.

A bottom auger or feed screw 17 is rotatably mounted between the forward wall 3 and rear wall 4. The bottom feed screw 17 includes an elongated horizontally extending shaft 18 preferably hollow for lightness of weight and having plugs 19 rigidly secured in the ends thereof. The plugs 19 rigidly retain stud shafts or shaft extensions 20 and 21 therein which extend therefrom respectively through the forward wall 3 and rear wall 4. Suitable supports such as ball bearing pillow blocks 23 and 24 are respectively secured to angles 25 and 26 which are in turn respectively fixed to the forward wall 3 and rear wall 4. The stud shafts 20 and 21 extend into and through the ball bearing pillow blocks 23 and 24 whereby the bottom feed screw 17 is rotatably supported in the trough 8.

Figure 3:
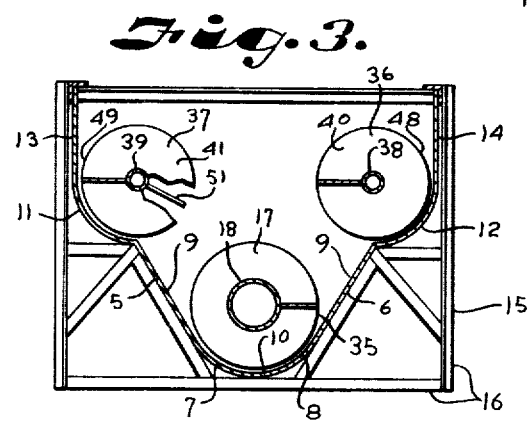
FIG. 3 is a sectional view through the apparatus taken on the line 3—3, FIG. 1, showing the concave bottom and concave side portions of the mixer hopper with the respective feed screws adjacent thereto.
Figure 8:
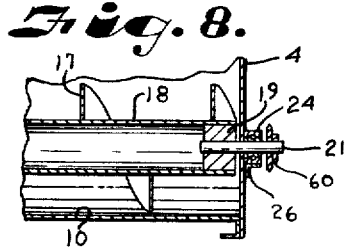
FIG. 8 is a fragmentary sectional view through the bottom feed screw taken on the line 8—8, FIG. 1 showing the mounting members therefor.

A suitable conveying member such as a first continuous helical flight 27 is secured to the hollow shaft 18 and has one end 28 terminating adjacent the forward wall 3. The flight 27 has the helix thereof formed right-handed, that is, when turned in a clockwise direction, advances into a hypothetical receiver. A second flight 29 is of the same pitch as flight 27 but is left-handed, that is, if turned in a clockwise direction, advances out of a hypothetical threaded receiver, and is of substantially greater length than the first flight 27. The second flight 29 has one end 30 thereof terminating adjacent the rear wall 4. The first and second flights 27 and 29 each have the respective other ends thereof 31 and 32 terminating in neighboring relation, forming an area of mutual convergence 33. A series of spaced horizontal projections 33' extend radially outwardly of the hollow shaft 18 in the area 33 to increase mixing turbulence as described hereinafter. The outer peripheries 34 and 35 of the flights 27 and 29 terminate adjacent the concave bottom 10, FIGS. 3 and 6.

A pair of side conveyors such as feed screws 36 and 37 are rotatably mounted between the forward wall 3 and rear wall 4 upwardly and laterally spaced from the bottom feed screw 17. The side feed screws 36 and 37 respectively include elongated shafts 38 and 39 extending parallel to the bottom feed screw shaft 18. Right-handed continuous helical flights 40 and 41 of the same pitch as the flights 27 and 29 are respectively secured to the elongated shafts 38 and 39 and each has one end 42 and 43 respectively thereof terminating adjacent the forward wall 3, FIG. 1. The other ends 44 and 45 of the flights 40 and 41 terminate in spaced relation to the rear wall 4 forming respective areas 46 and 47 of material direction reversal discussed in more detail hereinafter. The outer peripheries 48 and 49 of the respective flights 40 and 41 terminate adjacent the side wall concave portions 11 and 12, FIG. 3.

Paddles or agitators 50 and 51 are respectively secured to the shafts 38 and 39 adjacent the rear wall 4 for the purpose of preventing material from packing thereagainst during mixing. The elongated shafts 38 and 39 extend through the forward wall 3 and rear wall 4 and into suitable bearing supports such as ball bearing pillow blocks 52, 53, 54 and 55 secured to angles 56 and 57 fixed to the respective forward wall 3 and rear wall 4, thus rotatably mounting the side feed screws 36 and 37.

The elongated shafts 38 and 39 respectively extend rearwardly through the pillow blocks 52 and 55 and have matched driving members or sprocket wheels 58 and 59 respectively there secured. The stud shaft 21 extends rearwardly through the pillow block 24 and has a driving member or sprocket wheel 60 of approximately one-half the diameter of the sprocket wheels 58 and 59 secured thereto. The sprocket wheels 58, 59 and 60 are mutually aligned and a flexible driving member or sprocket chain 61 is engaged with each of said sprocket wheels 58, 59 and 60 to provide an operative connection therebetween. It is apparent that, due to the relative diameters of the sprocket wheels 58, 59 and 60, the bottom feed screw 17 makes two revolutions for one revolution of the side feed screws 36 and 37 and each of the feed screws 17, 36 and 37 rotate in the same direction.

A suitable prime mover such as an internal combustion gasoline engine 62 is secured to the frame structure 15 in any convenient location, in the example shown, adjacent the upper portion of the forward wall 3. The engine 62 is operatively connected to the shaft 18 by suitable transmission means and in the illustrated structure said engine drives a belt 63 engaged with a pulley 64 secured to a shaft 65 rotatably mounted on the frame structure 15. The shaft 65 has a sprocket wheel 66 fixed thereto and thus rotating therewith. The sprocket wheel 66 forms the input of a speed reducing system 66' consisting of a sprocket chain 67, sprocket wheel 68, sprocket wheel 68', sprocket chain 69, sprocket wheel 70 and sprocket wheel 71 which are operatively connected in a well known manner whereby the input speed thereinto is considerably reduced while the input torque is considerably increased. The sprocket wheel 71 is engaged with a sprocket chain 72 which engages a sprocket wheel 73 fixed to the stud shaft 20 to drive the bottom feed screw 17. An idler pulley 74 is rotatably mounted on an arm 75 which is pivotally retained with a bolt 75' extending into a horizontal slot 76 in a support member 77 secured to the angle 56. A helical tension spring 78 is anchored at one end thereof to the angle 25 and at the other end thereof to the arm 75 adjacent the pulley 74. The adjustment of the arm 75 to various positions along the slot 76 varies the tension that the spring 78 exerts against the pulley 74, thus controlling the tension of the sprocket chain 72. It is noted that the feed screws 17, 36 and 37 are driven simultaneously in a counter-clockwise direction as viewed from the forward wall 3, FIG. 4.

A material discharge opening or port 79 is provided in the side wall 6 adjacent the area of mutual convergence 33. An outlet door 80 which is slidably retained against the wall 6 by means of suitable guide runners 81, normally closes the port 79, for example during periods of material mixing. A pair of arms 82 are pivotally connected at one end 83 thereof to the door 80 and at the other end 84 thereof to extensions 85 of a shaft 86. The shaft 86 is pivotally mounted by means of ears 87 secured to the frame structure 15. The shaft 86 terminates in a handle 88 by which the shaft 86 may be rotated to raise the arms 82 and thus open the door 80. In the closed position, the bottom of the door rests against an angle 89 secured to the side wall 6, FIG. 6.

Referring to FIG. 9, a material raising device such as a screw elevator 90 may be mounted with the mouth 91 thereof located coincident with the mixer opening or port 79. In the illustrated example, the mouth 91 is retained against the portion of the wall 6 defining the opening or port 79 by means of the guide runners 81. A suitable door 92 slidable between the mouth 91 and the screw 93 prevents the material from entering the screw elevator 90 until the desired mixing has occured.

In operation, the material to be mixed is dumped into the hopper 2, and the internal combustion engine 62 is started. A typical speed of rotation of the feed screws is 12 r.p.m. for the bottom feed screw and 6 r.p.m. for the side feed screws. The material resting adjacent the side feed screws 36 and 37 is urged toward the rear wall 4 and tends to accumulate in the areas 46 and 47. The paddles or agitators 50 and 51 prevent the material from packing against the rear wall 4 and generally tend to keep the mass constantly in motion. The bottom feed screw 17, operating at twice the speed of the side feed screws 36 and 37, tends to pull an equal volume of material toward the forward wall 3 as is deposited in the areas 46 and 47 by the side feed screws 36 and 37. The relative motion between the streams of material first moving toward the rear wall 4 and then toward the forward wall 3 creates cross currents and eddies within the material which tends to produce a thorough and complete intermixing thereof. As the material is drawn toward the forward wall 3, it reaches the area of mutual convergence 33 where the flight 27 tends to urge it in the opposite direction, and the projections 33' cause flow disturbances creating a focal point of high turbulence wherein the material is crowded or forced upwardly into contact with the side feed screws 36 and 37 which urges same toward the rear wall 4 to repeat the mixing cycle. The material being mixed is at its highest pressure and most turbulent condition in the area of mutual convergence 33 and thus this makes an ideal location for the opening or port 79 through which the mixed material may be emptied. It is noted that due to the direction of flight rotation there is no tendency for material to pack against the forward wall 3 and any tendency for the material to pack at the rear wall 4 is thwarted by the action of the paddles or agitators 50 and 51.

The apparatus above-described has been found to operate efficiently with either small or large quantities of material to be mixed, a load which is so small as not to reach to the levels of the side feed screws 36 and 37 being effectively inter-mixed at the area of mutual convergence 33.

It is to be understood that while we have illustrated and described one form of our invention, it is not to be limited to the specific form or arrangement of parts herein described and shown except insofar as such limitations are included in the claims.

What we claim and desire to secure by Letters Patent is:

1. Apparatus for mixing feeds and the like comprising, a hopper adapted to contain feed materials to be mixed and screw conveyor means therein adapted to operate submerged beneath the mass of feed material to produce movement of said feed materials in said hopper, said hopper having a rounded bottom, opposed side walls and spaced front and rear end walls connected with said bottom and side walls to define a mixing chamber having a trough-like portion at the bottom and extending longitudinally between said end walls, a first horizontal screw conveyor along said bottom longitudinally of said trough-like portion, an upper horizontal screw conveyor in said chamber spaced above said first horizontal screw conveyor and extending longitudinally of said chamber, and driving means operatively connected to said upper conveyor to rotate same whereby said upper conveyor moves feed materials in the upper portion of said mass of feed to an area adjacent said rear end wall, said first screw conveyor having flight portions of opposite spiral extending respectively from the front and rear end walls and terminating in ends adjacent to each other in an area of convergence of the feed materials moved by said flight portions, said area being between the front end wall and the longitudinal center of said chamber, said driving means being operatively connected to said first conveyor to rotate same to move feed from said end walls in said trough-like portion to said area of convergence to force feed materials moved by said opposed flight portions together in a compressing action squeezing the feed materials outwardly and upwardly for movement by said upper conveyor back toward said rear end wall.

2. Apparatus for mixing feeds and the like comprising, a hopper adapted to contain feed materials to be mixed and screw conveyor means therein adapted to operate submerged beneath the mass of feed materials to produce movement of said feed materials in said hopper, said hopper having a rounded bottom, upwardly and outwardly inclined side walls and spaced front and rear end walls connected with said bottom and side walls to define a mixing chamber having a trough-like portion at the bottom and extending longitudinally between said end walls, a first horizontal screw conveyor along said bottom longitudinally of said trough-like portion, upper laterally spaced horizontal screw conveyors in said chamber spaced above said first horizontal screw conveyor and extending longitudinally of said chamber, and driving means operatively connected to said upper conveyors to rotate same whereby said upper conveyors move feed materials in the upper portion of said mass of feed to an area adjacent said rear end wall, said first screw conveyor having flight portions of opposite spiral extending respectively from the front and rear end walls and terminating in ends adjacent to each other in an area of convergence of feed materials moved by said flight portions, said area being between the front end wall and the longitudinal center of said chamber, said driving means being operatively connected to said first conveyor to rotate same to move feed from adjacent said end walls along the bottom to said area of convergence to force feed materials moved by said opposed flight portions together in a compressing action squeezing the feed materials outwardly and upwardly for movement by said upper conveyors back toward said rear end wall.

3. Apparatus for mixing feeds and the like comprising, a hopper adapted to contain feed materials to be mixed and screw conveyor means therein adapted to operate submerged beneath the mass of feed materials to produce movement of said feed materials in said hopper, said hopper having a rounded bottom, upwardly and outwardly inclined side walls and spaced front and rear end walls connected with said bottom and side walls to define a mixing chamber with a trough-like portion defined by said bottom and extending longitudinally between said front and rear end walls, a first horizontal screw conveyor along said bottom and extending longitudinally of said chamber, a pair of laterally spaced horizontal screw conveyors in said chamber spaced above said first horizontal screw conveyor, driving means operatively connected to said pair of conveyors to simultaneously rotate same, said pair of conveyors each having spiral flights thereon arranged to move feed material in the upper part of said chamber toward an area adjacent said rear end wall, said spiral flights on said pair of conveyors terminating in spaced relation to said rear wall, and radially extending means in close proximity to the rear end wall and rotatable with the respective conveyors of said pair for eliminating packing of feed materials against said rear end wall, said first screw conveyor having flight portions of opposite spiral extending respectively from the front and rear end walls and terminating in ends adjacent to each other in an area of convergence of the feed materials moved by said flight portions of said first screw conveyor, said area being between the front end wall and the longitudinal center of said chamber, said driving means being operatively connected to said first conveyor to rotate same to move feed materials from said end walls along the bottom of said trough-like portion of the chamber to said area of convergence to force the feed materials moved by said opposed flight portions together in a compressing action squeezing said feed materials outwardly and upwardly for movement by said pair of conveyors back toward said rear end wall.

4. Apparatus for mixing feeds and the like comprising, a hopper adapted to contain feed materials to be mixed and screw conveyor means therein adapted to operate submerged beneath the mass of feed materials to produce movement of said feed materials in said hopper, said hopper having a rounded bottom wall, upwardly and outwardly inclined side walls and spaced front and rear end walls connected with said bottom and side walls to define a mixing chamber with a trough-like portion defined by said bottom wall and extending longitudinally between said front and rear end walls, a first horizontal screw conveyor along said bottom wall and extending longitudinally of said chamber, a pair of laterally spaced horizontal screw conveyors in said chamber spaced above said first horizontal screw conveyor, driving means operatively connected to said pair of conveyors to simultaneously rotate same, said pair of conveyors each having spiral flights thereon arranged to move feed material in the upper part of said chamber toward an area adjacent said rear end wall, said spiral flights on said pair of conveyors terminating in spaced relation to said rear wall, said first screw conveyor having flight portions of opposite spiral extending respectively from the front and rear end walls and terminating in ends adjacent to each other in an area of convergence of feed materials moved by said flight portions of said first screw conveyor, said area being between the front end wall and the longitudinal center of said chamber, said driving means being operatively connected to said first conveyor to rotate same to move feed materials from said end walls along the bottom wall of said trough-like portion of the chamber to said area of convergence to force the feed materials moved by said opposed flight portions together in a compressing action squeezing said feed materials outwardly and upwardly for movement by said pair of conveyors back toward said rear end wall, a material discharge port in a hopper wall at the area of convergence formed by the opposed flight portions of said screw conveyor, and a door movably mounted on said hopper normally closing said material discharge port whereby when said door is moved to port opening position the feed materials moved to the area of convergence is forced outwardly through said discharge port.

5. Apparatus for mixing feeds and the like comprising, a hopper adapted to contain feed materials to be mixed and screw conveyor means therein adapted to operate submerged beneath the mass of feed materials to produce movement of said feed materials in said hopper, said hopper having a rounded bottom, opposed side walls having upwardly and outwardly inclined portions with longitudinally extending arcuate portions thereabove and spaced front and rear end walls connected with said bottom and side walls to define a mixing chamber with a trough-like portion defined by said bottom and extending longitudinally between said front and rear end walls, a first horizontal screw conveyor along said bottom and extending longitudinally of said chamber, a pair of laterally spaced horizontal screw conveyors in said chamber spaced above said first horizontal screw conveyor and adjacent said arcuate portions of respective side walls, driving means operatively connected to said pair of conveyors to simultaneously rotate same, said pair of conveyors each having spiral flights thereon arranged to move feed material along said arcuate portions of the side walls toward an area adjacent said rear end wall, said spiral flights on said pair of conveyors terminating in spaced relation to said rear wall, radially extending means in close proximity to the rear end wall and rotatable with the respective conveyors of said pair for eliminating packing of feed materials against said rear end wall, said first screw conveyor having flight portions of opposite spiral extending respectively from the front and rear end walls and terminating in ends adjacent to each other in an area of convergence of feed materials moved by said flight portions of said first screw conveyor, said area being between the front end wall and the longitudinal center of said chamber, said driving means being operatively connected to said first conveyor to rotate same to move feed materials from said end walls along the bottom of said trough-like portion of the chamber to said area of convergence to force the feed materials moved by said opposed flight portions together in a compressing action squeezing said feed materials outwardly and upwardly for movement by said pair of conveyors back toward said rear end wall, a material discharge port in said hopper adjacent the bottom at the area of convergence formed by the opposed flight portions of said first screw conveyor, and a door movably mounted on said hopper normally closing said material discharge port whereby when said door is moved to port opening position the feed materials moved to the area of convergence is forced outwardly through said discharge port.

6. Apparatus for mixing feeds and the like comprising, a hopper adapted to contain feed materials to be mixed and screw conveyor means therein adapted to operate submerged beneath a mass of feed material in said hopper, said hopper having a rounded bottom, upwardly and outwardly inclined side walls and spaced front and rear end walls connected with said bottom and side walls to define a mixing chamber having a trough-like portion along said bottom wall extending longitudinally between said front and rear end walls, a first shaft extending longitudinally in said trough-like portion of said chamber, means on said end walls rotatably mounting said first shaft, screw conveyor flight portions of opposite spiral fixed on said first shaft and extending respectively from the front and rear end walls and terminating in ends adjacent to each other in an area of convergence of feed materials moved by said flight portions on said first shaft, said area being between the front end wall and the longitudinal center of said chamber, an upper horizontal shaft in said chamber spaced above said first horizontal shaft, means on said end walls rotatably supporting said upper shaft, a spiral screw conveyor flight fixed on said upper shaft and extending from said front wall to adjacent said rear end wall and terminating in spaced relation thereto, driving means operatively connected to said upper shaft to rotate same whereby said conveyor flight thereon moves feed materials toward an area adjacent said rear end wall, radial paddle means fixed to said upper shaft in close proximity to the rear end wall and rotatable with said shaft for eliminating packing of feed materials against said rear end wall, said driving means being operatively connected to said first shaft to rotate same whereby the opposed conveyor flight portions thereon move feed from said end walls along the bottom of said trough-like portion and compress said feed materials at said area of convergence and effect movement of the compressed feed materials outwardly and upwardly from said area of convergence, and a material discharge means on said hopper adjacent the bottom at the area of convergence and operable for discharge of compressed feed materials from said hopper.

7. Apparatus for mixing feeds and the like comprising, a hopper adapted to contain feed materials to be mixed and screw conveyor means therein adapted to operate submerged beneath a mass of feed material to produce movement of said feed material in said hopper, said hopper having a rounded bottom, upwardly and outwardly inclined side walls and spaced front and rear end walls connected with said bottom and side walls to define a mixing chamber having a trough-like portion along said bottom wall extending longitudinally between said front and rear end walls, a first shaft extending longitudinally in said trough-like portion of said chamber, means on said end walls rotatably mounting said first shaft, screw conveyor flight portions of opposite spiral fixed on said first shaft and extending respectively from the front and rear end walls and terminating in ends adjacent to each other in an area of convergence of feed materials moved by said fligh portions on said first shaft, said area being between the front end wall and the longitudinal center of said chamber, laterally spaced upper horizontal shafts in said chamber spaced above said first horizontal shaft, means on said end walls rotatably supporting said upper shafts, a spiral screw conveyor flight fixed on each of said upper shafts and extending from said front wall to adjacent said rear end wall and terminating in spaced relation thereto, driving means operatively connected to said upper shafts to rotate same whereby said conveyor flights thereon move feed materials toward said rear end wall, radial paddle means fixed to said upper shaft in close proximity to the rear end wall and rotatable with said shaft for eliminating packing of feed materials against said rear end wall, said driving means being operatively connected to said first shaft to rotate same whereby the opposed conveyor flight portions thereon move feed from said end walls along the bottom of said trough-like portion to said area of convergence to force the feed materials moved by said opposed flight portions together in a compressing action squeezing said feed materials outwardly and upwardly for movement by said upper shaft conveyor back toward said rear end wall, a material discharge port in said hopper adjacent the bottom at the area of convergence formed by the opposed flight portons of said first screw conveyor, and a door movably mounted on said hopper normally closing said material discharge port whereby when said door is moved to port opening position the feed materials moved to the area of convergence is forced outwardly through said discharge port.

References Cited in the file of this patent
UNITED STATES PATENTS

| | | |
|---|---|---|
| 1,499,890 | Stevens | July 1, 1924 |
| 1,750,645 | Offenhauser | Mar. 18, 1930 |
| 1,896,616 | Gillican | Feb. 7, 1933 |

UNITED STATES PATENT OFFICE
CERTIFICATE OF CORRECTION

Patent No. 3,090,605 May 21, 1963

James V. Copeland et al.

It is hereby certified that error appears in the above numbered patent requiring correction and that the said Letters Patent should read as corrected below.

In the grant, lines 1 and 2, and 11, and in the heading to the printed specification, line 3, name of second inventor, for "Benjamin R. Weier", each occurrence, read -- Benjamin R. Neier --.

Signed and sealed this 3rd day of December 1963.

(SEAL)
Attest:

ERNEST W. SWIDER

Attesting Officer

EDWIN L. REYNOLDS

Acting Commissioner of Patents